S. H. EVERETT, Jr.
ELECTRICAL SYSTEM OF DISTRIBUTION.
APPLICATION FILED JULY 9, 1909.
1,114,872.
Patented Oct. 27, 1914.
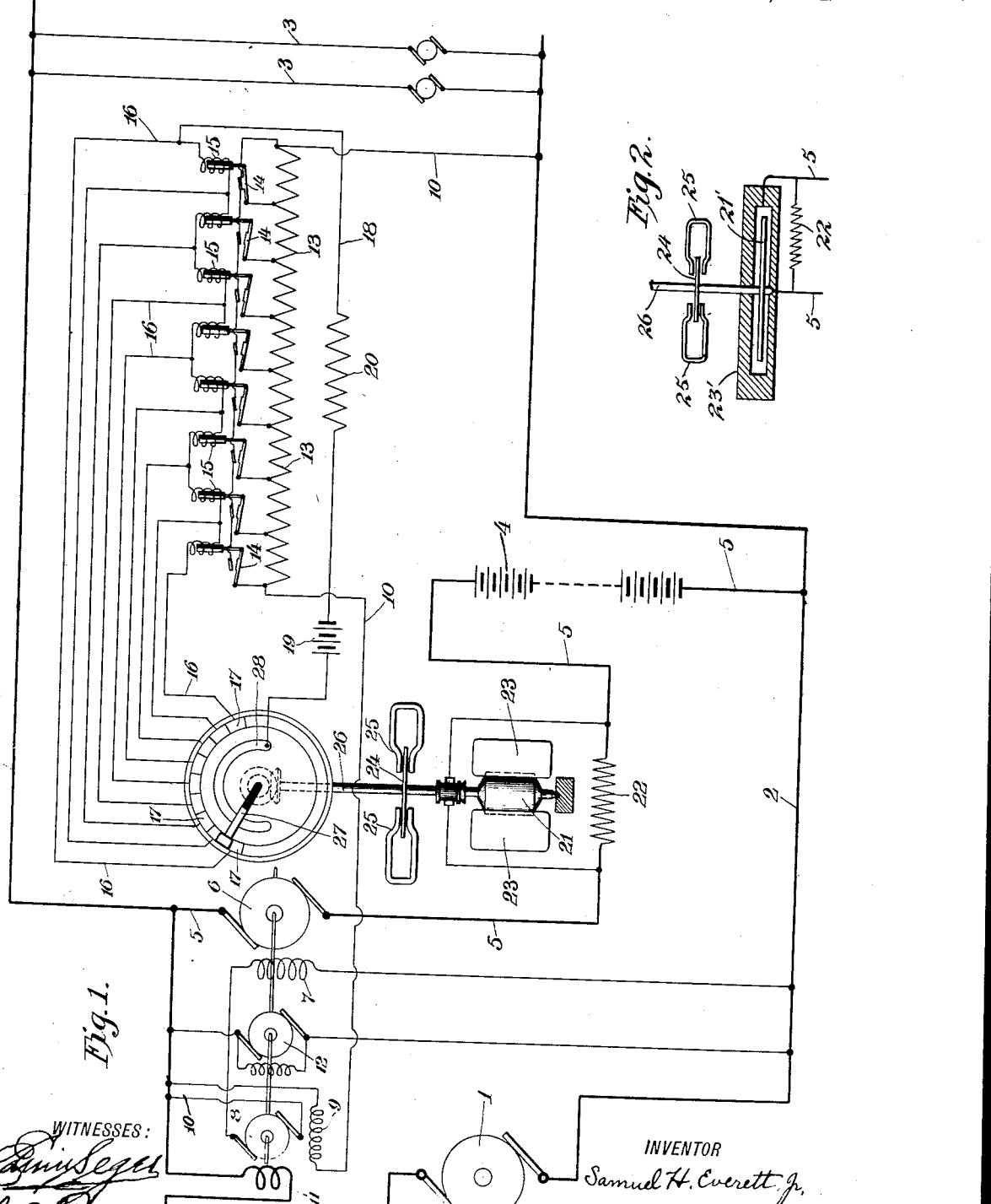
WITNESSES:
INVENTOR
Samuel H. Everett, Jr.
BY
Kenyon & Kenyon
his ATTORNEYS

UNITED STATES PATENT OFFICE.

SAMUEL H. EVERETT, JR., OF BROOKLYN, NEW YORK, ASSIGNOR TO GOULD STORAGE BATTERY COMPANY, A CORPORATION OF NEW YORK.

ELECTRICAL SYSTEM OF DISTRIBUTION.

1,114,872.  Specification of Letters Patent.  Patented Oct. 27, 1914.

Application filed July 9, 1909. Serial No. 506,736.

*To all whom it may concern:*

Be it known that I, SAMUEL H. EVERETT, Jr., a citizen of the United States, and a resident of the borough of Brooklyn, county of Kings, and State of New York, have invented certain new and useful Improvements in Electrical Systems of Distribution, of which the following is a specification.

My invention relates to electrical systems of distribution and more especially to that class of systems in which a battery or other storage apparatus is included together with means for controlling the action of the battery to maintain a substantial average load upon the main source.

One object of my invention is to provide an economical and efficient arrangement in such systems whereby the average load which the generator is supposed to take may be varied in accordance with the requirements of the system.

A further object of my invention is to provide an efficient apparatus for accomplishing this purpose.

In one preferred form of my improved arrangement I vary the action of the regulating means by means of a rheostatic device or variable resistance which is controlled by a plurality of switches operated electromagnetically. The circuits energizing these switches are operated by a device which in the preferred embodiment of my invention consists substantially of an ampere hour meter arrangement, the meter being connected to be responsive to changes in the battery current.

Further objects, features and advantages will more clearly appear from the detailed description given below taken in connection with the accompanying drawing, in which Figure 1 shows diagrammatically a system embodying one form of my improvements and Fig. 2 shows diagrammatically a modified form of motor.

In the drawing, 1 represents a main generator feeding the circuit 2, 2, which in turn supplies the work circuit 3, 3. 4 is a storage battery connected across the mains 2, 2, by means of a circuit 5, 5. In series with the battery 4 is a booster 6 provided with the usual field windings 7 energized by a counter-machine 8. The counter-machine 8 is provided with a normally constantly excited field coil 9 connected across the mains 2, 2, by a circuit 10. The exciter 8 is also provided with field windings 11 in series in the main 2, so that these windings are responsive to variations in the generator current. The booster 6 and counter-machine 8 are driven by a shunt motor 12 connected across the mains 2, 2.

The operation of the arrangement so far described is as follows: Under normal conditions field coils 9 and 11 are connected to operate differentially. Under normal average load the strength of field 11 will predominate over that of field 9 to such an extent that the voltage of the counter-machine will be exactly equal to that of the system, and no current will flow through field 7. Accordingly the booster 6 will not be energized and the battery 4 will float across the line, its voltage being arranged to be sufficient for this purpose. When an increase in load occurs on the system the strength of coil 11 increases thereby raising the voltage of the counter-machine and causing the booster to be excited to produce an electromotive force to aid the battery to discharge and take substantially the extra load. Likewise when a decrease below the average generator load occurs, the strength of the predominating field 11 decreases and accordingly the voltage of the counter-machine decreases, and the booster is caused to produce an electromotive force in the opposite direction to cause the battery to charge.

From the above it will be clear that the parts so far described afford means for causing the battery to take substantially all the fluctuations above or below a certain desired average. When, however, the increases or decreases in load become prolonged and sustained it may be desirable that the average load which will fall upon the generator be changed so that so much energy will not be taken from the battery or used up therein. That is, it is desired that the operation of the battery shall be confined to those more or less sudden fluctuations and that the generator shall be arranged to take the more or less prolonged and sustained fluctuations within certain limits. For this purpose I have provided a rheostatic device or variable resistance 13 which is in series with the field coil 9 and the circuit 10. The resistance 13 is arranged to have various parts thereof shortcircuited by means of switches 14. Each of these switches is controlled electro-magnetically by means of a solenoid 15, each of the coils of the various solenoids 15 being provided with an independent circuit 16 connected to contact pieces 17. A common return 18 is provided for said circuits in which is included an auxiliary battery 19 for energizing the circuits. A fixed resistance 20 may also be included in this conductor so that by using a comparatively high voltage the current in the contactor coils 15 will remain approximately constant regardless of the number of coils in circuit.

In series in the battery circuit I place an ampere hour meter which may be of the mercury unipolar motor type. The meter shown in Fig. 1 is provided with an armature 21 connected across a shunt 22, so that it is energized by current proportionately to the battery current.

23, 23 represent stationary pole pieces for the armature and 24 is a disk mechanically connected to the armature and arranged to rotate within fixed magnets 25, so as to provide a magnetic damping device therefor. The damping is due to the eddy currents set up within the disk 24, which is preferably of copper or some suitable material. The armature 21 is arranged to drive the shaft 26, which through suitable gears, is arranged to move an arm 27. The arm 27 is arranged to rotate over the contacts 17 and also over a continuous contact piece 28, so that electrical contact will be made between the contact piece 28 and one or more of the various contact pieces 17, in accordance with the position of the arm 27. The mechanical connection between the shaft 26 and arm 27 may be geared down so that the arm 27 may have any suitable speed. The return conductor 18 is connected to the contact piece 28 so that as the arm 27 rotates one or more of the circuits 16 will be closed and energized.

The pole pieces 23 may be permanently magnetized or magnetized from any suitable source since there are many arrangements well known in the art relating to such devices.

In Fig. 2 a mercury unipolar type motor is diagrammatically shown in which the armature 21' rotates in a chamber of mercury subjected to a magnetic field, as by material 23'.

The further operation of the arrangement is as follows: When an increase in load occurs on the system above that average which the generator is designed to take the battery is caused to discharge as above described. If the fluctuation is sustained the discharge current causes the ampere hour meter to be operated so that the arm 27 moves over the contact pieces 17 and energizes one or more of the electromagnets 15. This energization causes the closing of the switches 14, beginning at the right hand side of the figure. This action causes a step by step shunting of parts of the resistance 13, so that the strength of coil 9 is increased step by step. This action decreases the energization of the exciter 8 thereby decreasing the effect of the booster 6 and cutting down the discharge current. This action will continue until the battery current has been brought to zero and a new average load is set for the main generator 1. If now the load on the system should decrease the battery would receive a charging current in the opposite direction which would cause the armature 21 to revolve in the opposite direction and the arm 27 to move backward so that the various solenoids would be deenergized from left to right and the switches 14 opened, in order to increase the resistance in series with the field coil 9. This decreases the effect of the field coil 9 and consequently decreases the average load on the generator to departures from which the exciter and booster are made responsive.

From the above it will be clear that I have provided an exceptionally efficient and economical arrangement for varying and adjusting the average load which shall fall upon the main source of supply in these systems. The ampere hour arrangement used is exactly proportional in its operation to the battery action and to the time which its current flows and is simple and efficient in its operation. The plurality of switches 14 operated as described form a convenient and efficient means for varying the average load step by step, so that certain small and rapid fluctuations will not effect the average load which falls upon the generator.

Although I have described one form of my improvements in great details, nevertheless I do not desire to be limited to such details, except as specified in the claims, but Having thus fully and clearly described my invention what I claim as new and desire to secure by Letters Patent, is:

1. In an electrical system of distribution, the combination of a main generator, a work circuit and storage battery fed thereby, means including a coil serially connected between the generator on one side and the battery and work circuit on the other side for controlling the charge and discharge of the battery responsive to variations in the total generator current output and means for adjusting said controlling means responsive to current changes in the battery circuit, said adjusting means including an armature energized by current responsive to changes in the battery current.

2. In an electrical system of distribution, the combination of a source of electrical energy, a work circuit and storage battery supplied thereby, means including a coil serially connected between the generator on one side and the battery and work circuit on the other side for controlling the division of load between the source and battery responsive to departures from an average load on the source, and means for varying the action of said controlling means to vary the average load which will fall upon the source, said means including an armature energized by current proportional to the battery current.

3. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including a plurality of switches operated electromagnetically, and a device the movement of which is proportional to the current in the battery circuit and the length of time it flows.

4. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including a plurality of switches operated electromagnetically and a device the movement of which is proportional to the current in the battery circuit.

5. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including an armature energized by current proportional to the battery current and a magnetic damping device for said armature.

6. In an electrical system of distribution, the combination of a source of electrical energy, a work circuit and storage battery supplied thereby, means for controlling the division of load between the source and battery responsive to departures from an average load on the system and means for varying the action of said controlling means to vary the average load which will fall upon the source, said means including a variable resistance and a plurality of electromagnetically operated switches to vary said resistance step by step.

7. In an electrical system of distribution, the combination of a source of electrical energy, a work circuit and storage battery supplied thereby, means for controlling the division of load between the source and battery responsive to departures from an average load on the system and means for varying the action of said controlling means to vary the average load which will fall upon the source, said means including a variable resistance and a plurality of electromagnetically operated switches to vary said resistance step by step, said switches being operated electromagnetically responsive to variations in the battery current.

8. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including an ampere hour meter having an armature energized responsive to battery current changes and a variable resistance controlled thereby.

9. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including an ampere hour meter, a plurality of switches and a variable resistance controlled thereby, said resistance being operated by said switches so as to provide a step by step variation in the average load.

10. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including a plurality of electro-magnetically operated switches, a variable resistance operated by said switches, a separate circuit for controlling each switch and means for energizing one or more of said circuits responsive to variations in the battery current.

11. In an electrical system of distribution, the combination of a source of electrical energy, a work circuit and storage battery supplied thereby, means for controlling the division of load between the source and battery responsive to departures from an average load on the system, and means for varying the action of said controlling means to vary the average load which will fall upon the source, said means including a plurality of switches, a variable resistance, a plurality of switches operating said resistance, electro-magnets controlling said switches, a separate circuit for controlling each switch and means for energizing one or more of said circuits responsive to variations in the battery current, said last mentioned means including an armature energized by current proportional to the battery current.

12. In an electrical system of distribution, a source of electrical energy, a work circuit and storage apparatus in operative relation therewith and connected to be supplied thereby, means for controlling the division of load between the source and storage apparatus responsive to departures from an average load on the source, and means for varying the action of said controlling means to vary the average load which will fall upon the source, said means including an ampere hour meter, a plurality of switches and a variable resistance operated thereby.

13. In an electrical system of distribution, a main generator, a work circuit and storage battery fed thereby, a booster for varying the action of the battery to control the division of load between the generator and battery, an exciter for the booster, a rheostatic device for varying the action of the exciter to vary the average load which will fall upon the generator, said device including a plurality of electromagnetic switches, circuits for controlling the same, and an armature energized by current responsive to changes in the battery current for controlling said circuits.

In testimony whereof, I have signed my name to this specification, in the presence of two subscribing witnesses.

SAMUEL H. EVERETT, Jr.

Witnesses:
  GORHAM CROSBY,
  EDWIN SEGER.